United States Patent [19]

Essert et al.

[11] Patent Number: 5,367,594
[45] Date of Patent: Nov. 22, 1994

[54] FIBER OPTIC SPLICER-CONNECTOR

[75] Inventors: Robert Essert, Glen Ellyn; Brent W. Thomas, Chicago, both of Ill.

[73] Assignee: The Whitaker Corporation, Wilmington, Del.

[21] Appl. No.: 65,937

[22] Filed: May 24, 1993

Related U.S. Application Data

[63] Continuation-in-part of Ser. No. 938,613, Sep. 1, 1992, abandoned.

[51] Int. Cl.⁵ .............................. G02B 6/38; G02B 6/26
[52] U.S. Cl. ............................................... 385/70; 385/60; 385/65; 385/66; 385/72; 385/95; 385/97; 385/99; 385/134; 385/135
[58] Field of Search ...................... 385/134, 135, 95, 96, 385/97, 98, 99, 66, 65, 70, 72, 53, 55, 56, 62, 60, 137

[56] References Cited

U.S. PATENT DOCUMENTS

| | | | |
|---|---|---|---|
| 4,142,776 | 3/1979 | Cherin et al. | 385/65 X |
| 4,515,434 | 5/1985 | Margolin et al. | 385/65 X |
| 4,593,972 | 6/1986 | Gibson | 385/65 X |
| 4,676,589 | 6/1987 | Miyashita et al. | 385/65 X |
| 4,755,018 | 7/1988 | Heng et al. | 385/65 X |
| 4,850,671 | 7/1989 | Finzel | 385/65 X |
| 4,986,626 | 1/1991 | Bossard | 385/76 X |
| 5,121,456 | 6/1992 | Essert | 385/70 |
| 5,134,678 | 7/1992 | Essert | 385/70 X |
| 5,151,964 | 9/1992 | Carpenter et al. | 385/65 X |
| 5,274,729 | 12/1993 | King et al. | 385/134 |

*Primary Examiner*—Brian Healy
*Attorney, Agent, or Firm*—Trexler, Bushnell, Giangiorgi & Blackstone, Ltd.

[57] ABSTRACT

An optical fiber splicer-connector comprises a fiber section, a splice section, and a connecting section. The splice section is located between the fiber section and the connecting section. A fiber channel is disposed on the fiber section for accepting an optical fiber and for guiding the optical fiber to the splice section. Means for splicing optical fibers is located on the splice section. A fiber channel is disposed on the connecting section for accepting an optical fiber and for guiding the optical fiber to the splice section. The connecting section includes a connecting body for releasably attaching the splicer to an adapter. In one embodiment, the splice section and the connecting section are provided as separate, interengagable pieces.

25 Claims, 4 Drawing Sheets

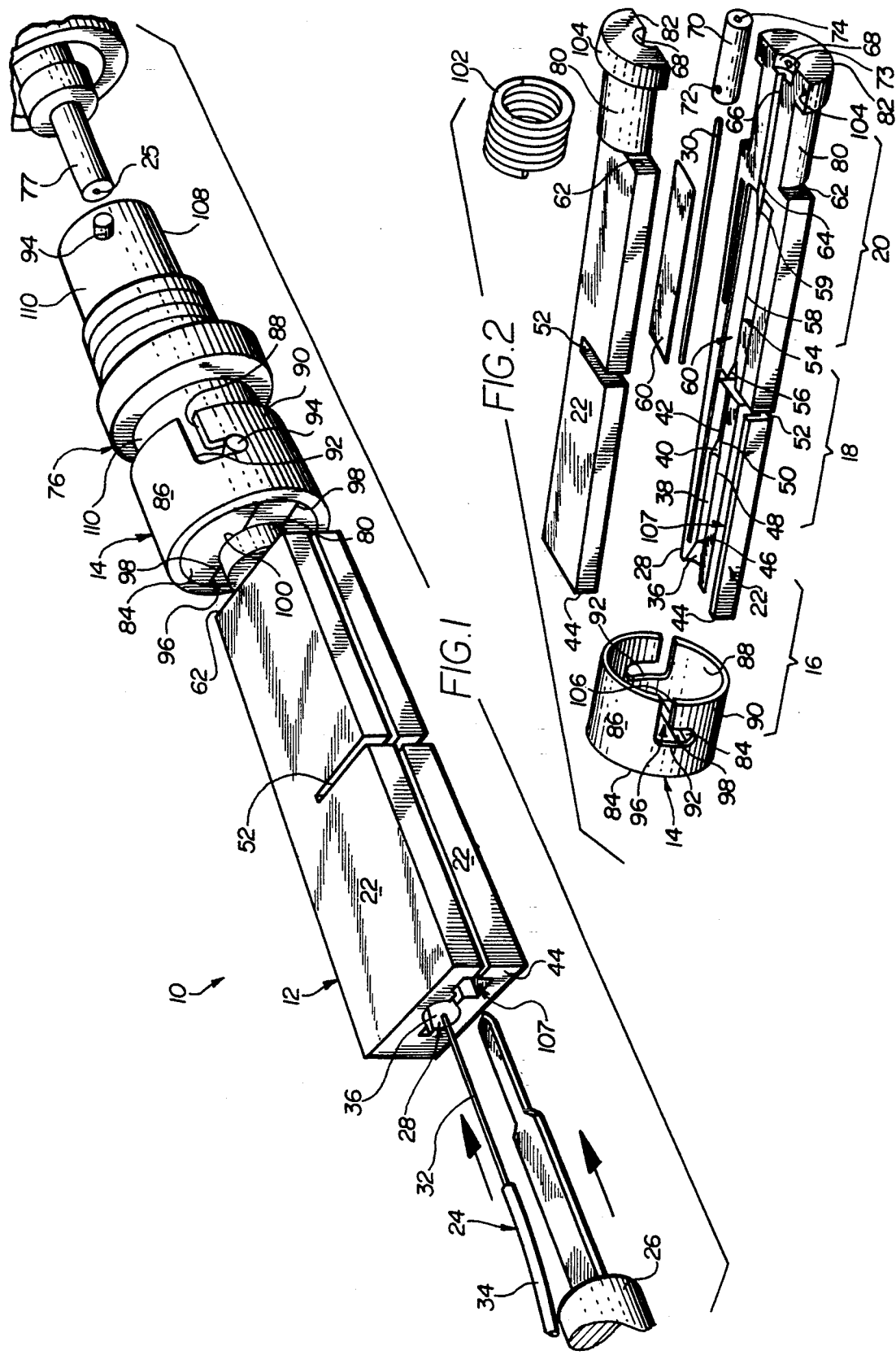

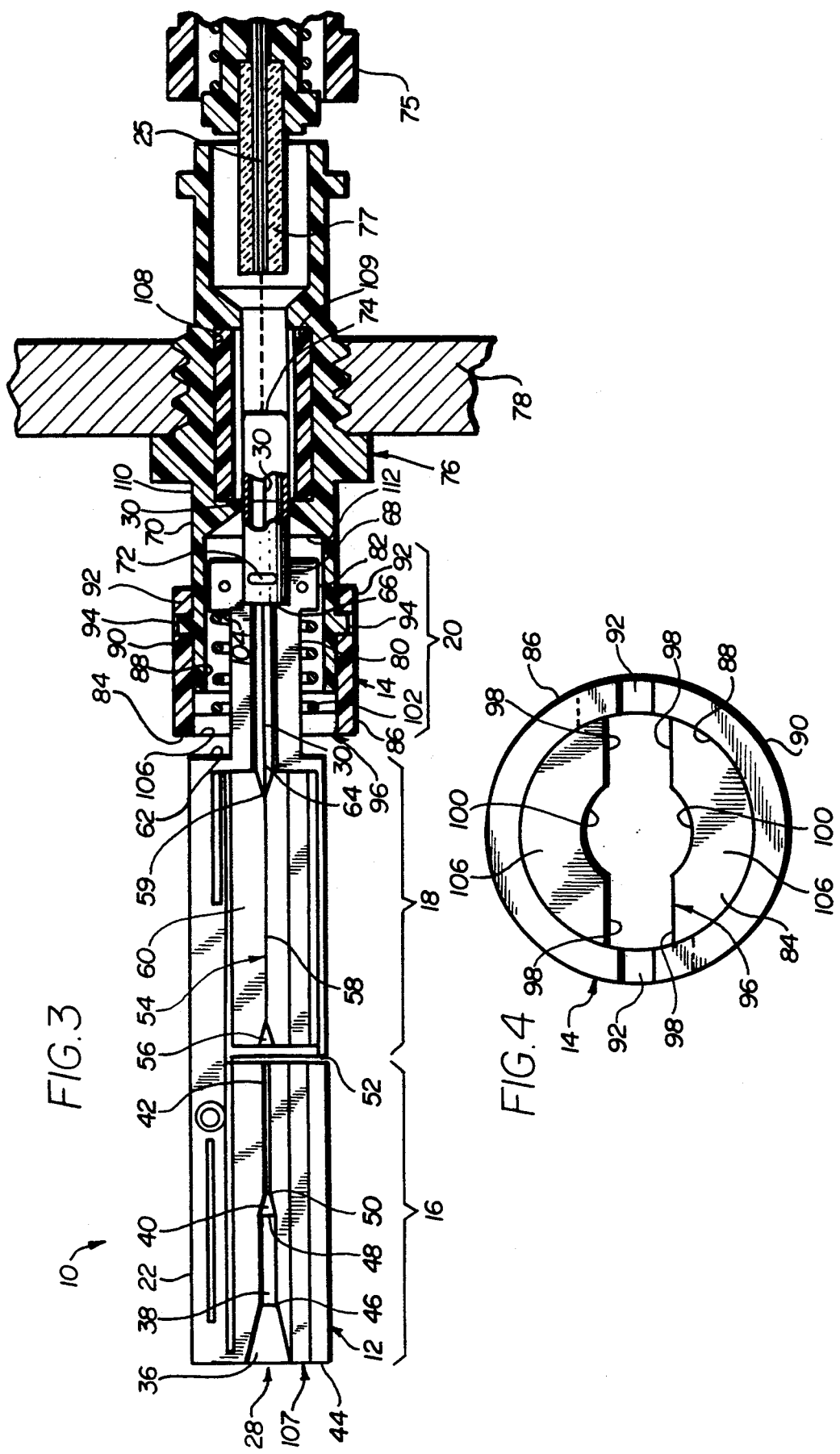

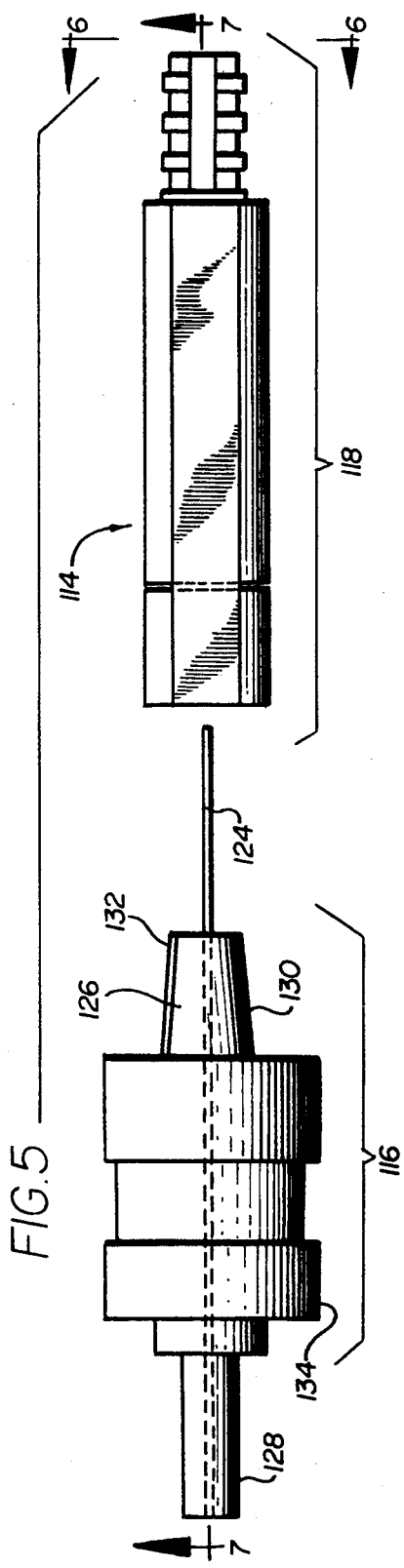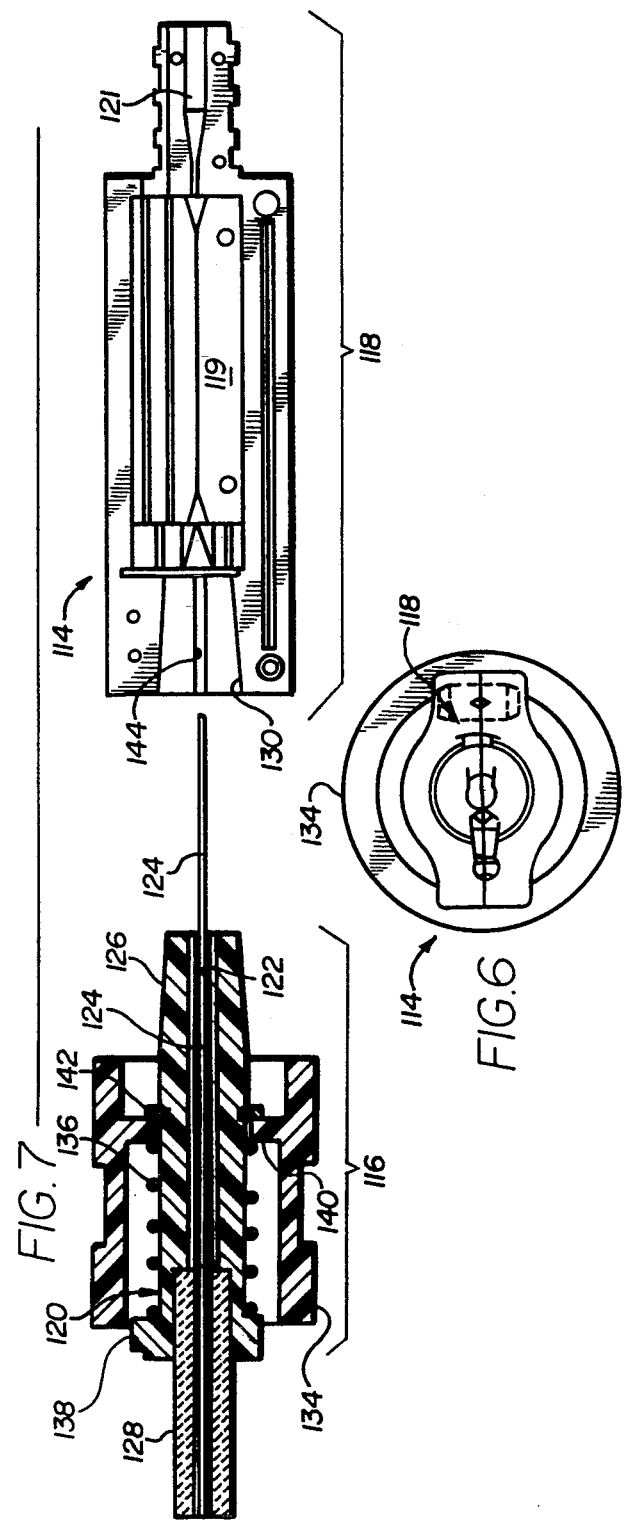

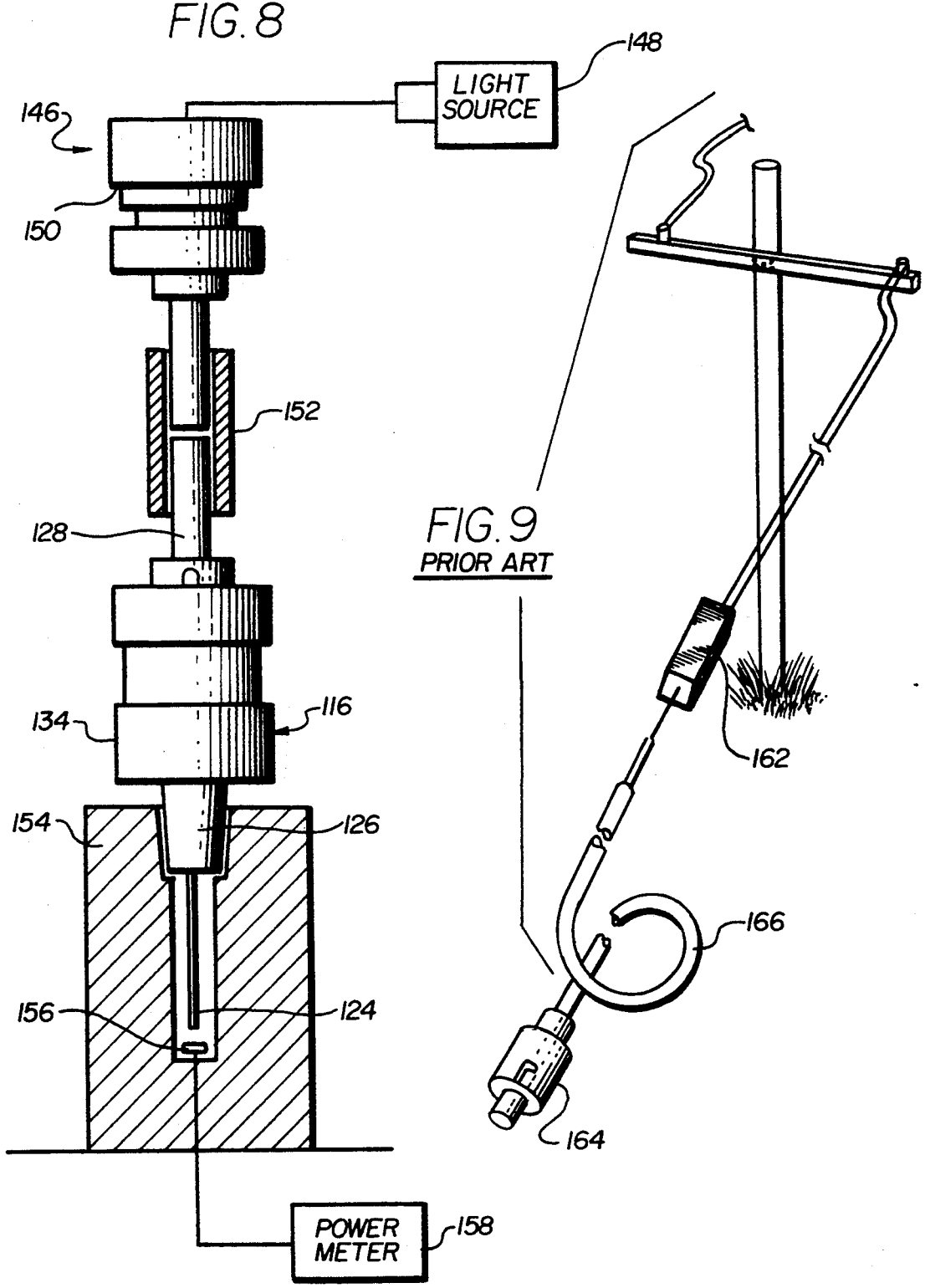

FIBER OPTIC SPLICER-CONNECTOR

CROSS-REFERENCE TO RELATED APPLICATION

This is a continuation-in-part of earlier application Ser. No. 07/938,613, filed Sep. 1, 1992, now abandoned.

BACKGROUND OF THE INVENTION

The present invention relates generally to a new and useful polymeric optical fiber splicer-connector useful for connecting two optical fibers together. More specifically, the invention relates to a connectorized optical fiber splicer-connector.

Many modern telecommunications networks have been converted from older, metallic wire-transmission lines, and accompanying technology, into newer, optical fiber transmission lines and technology. By performing this conversion, the telecommunications networks are able to provide better service to their subscribers.

Specifically, optical fiber telecommunications networks offer faster transmission speed and greater information density than the metallic wore networks. Also, the optical fiber networks have greater utility in employments with digital technology, as opposed to the metallic wire networks, which are more suited to use with analog technology. This is particularly important with the advent of computers networked by means of a telecommunications network, as well as the now common usage of facsimile machines.

While the conversion from metallic wire to optical fiber technology affords subscribers great benefits, the conversion is often troublesome for the network operators. While the equipment itself may be converted or replaced, the optical fiber equipment must occupy the same physical space as or less space than that occupied by the metallic wire equipment. Because the areas surrounding the equipment of the telecommunications network is limited, the optical fibers, and their accompanying equipment, which may require a space larger than the available space, will not fit into the existing space.

For instance, in order to connect optical fibers to a piece of telecommunications equipment, a splicer is first used to connect one optical fiber to another. Additionally, the spliced optical fiber must then be joined to the equipment through a connector. The splicer and the connector occupy a substantial amount of space, which is at a premium in a telecommunications network. Additionally, because essentially two separate connections must be made, the installation procedure can be tedious and complicated.

These problems lead to additional costs in reconfiguring the space as needed to house the splicer and the connector, as well as increased installation costs. The telecommunications network operator may or may not be able to pass these costs on to the subscribers. The polymeric splicer and connector, constructed according to the teachings of the present invention, is intended to assist in solving these, as well as other problems with telecommunications networks, as well as other systems using optical fiber technology.

OBJECTS AND SUMMARY OF THE INVENTION

A general object of the invention is to provide a uniquely constructed connectorized splicer or splicer-connector for optical fibers.

A more specific object of the invention is to provide an optical fiber splicer-connector having means for accepting a stripped optical fiber on one end thereof, and a connector on another end.

Another object of the present invention is to provide an optical fiber splicer-connector which combines the elements of a spicer with the elements of a connector.

An additional object of the invention is to provide an optical fiber splicer-connector which occupies less space than presently required for a splicer and a connector.

A further object of the present invention is to provide an optical fiber splicer-connector which can simplify installation of optical fibers.

Another object of the invention is to provide an optical fiber splicer-connector which can plug into an adapter directly.

Yet another object of the present invention is to provide an optical fiber splicer-connector assembly, as well as a method for constructing and testing the same, which allows the splicer-connector to be nondestructively tested at a factory to determine transmission quality.

An optical fiber splicer-connector, constructed according to the teachings of the present invention, comprises a fiber section, a splice section, and a connecting section. The splice section is located between the fiber section and the connecting section. A fiber channel is disposed on the fiber section for accepting an optical fiber and for guiding the optical fiber to the splice section. Means for splicing optical fibers is located on the splice section. A fiber channel is disposed on the connecting section for accepting an optical fiber and for guiding the optical fiber to the splice section. The connecting section includes a connecting body for releasably attaching the splicer-connector to an adapter. In one embodiment, the splice section and the connecting section are provided as separate, interengagable pieces.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description, taken in connection with the accompanying drawings in which like reference numerals identify like elements, and in which:

FIG. 1 is a perspective view of an optical fiber splicer-connector, constructed according to the teachings of the present invention, and also showing an adapter for joining the splicer-connector of the invention to another connector;

FIG. 2 is an exploded view of the optical fiber splicer-connector of FIG. 1;

FIG. 3 is a longitudinal sectional view of the optical fiber splicer-connector of FIG. 1, and an adapter for joining the splicer-connector of the invention to another connector;

FIG. 4 is an enlarged end view of the coupling nut shown in FIG. 1;

FIG. 5 is a side elevational view of another embodiment of the invention having separate, interengagable connector and splice assemblies;

FIG. 6 is an end view of the splicer-connector, taken along line 6—6 of FIG. 5;

FIG. 7 is a sectional view, taken along line 7—7 of FIG. 5, illustrating the construction of the assemblies;

FIG. 8 is an elevational view of a testing apparatus for testing transmission quality of the connector assembly; and FIG. 9 is a view, somewhat diagrammatic in form, of a prior art splicer and connector joined by an elongate pigtail optical fiber, which three elements are replaced by this invention.

DETAILED DESCRIPTION OF THE ILLUSTRATED EMBODIMENT

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Referring initially to FIG. 1, an optical fiber splicer-connector 10, constructed according to the teachings of the present invention, is shown. The splicer-connector 10 has a splice body or portion 12 substantially similar to the optical fiber splicer disclosed in the U.S. Pat. No. 5,121,456 of Essert et al., assigned to the assignee of the present invention, the disclosure of which is incorporated herein by this reference.

As illustrated in FIGS. 1-3, the splicer-connector 10 of the invention generally comprises the splice body 12 and a connecting body, coupling element or nut 14 disposed around a portion of the body 12. The splice body 12 is substantially rectangular in shape, except for the differences to be noted herein. The splice body 12 has a fiber section 16, a splice section 18, and a connecting section 20. The fiber section 16 and the connecting section 20 are disposed on opposite ends of the splice section 18.

The splicer 10 is comprised of two mirror image, and preferably identically constructed outer housing half portions 22, as shown in FIG. 2, thereby facilitating assembly. Accordingly, the construction of the half portions 22 will be disclosed with respect to only one thereof. The two half portions 22 are welded together along one side, and can be partially separated along the other side to allow for insertion and removal of optical fiber 24, having a waveguide 32 and a buffer 34, by insertion and subsequent rotation of a particularly configured tool 26, as shown in FIG. 1. For a more complete understanding of the construction and operation of this structure, reference should be made to the above-cited patent.

The fiber section 16 bears a fiber channel 28 constructed to house and protect the optical fiber 24, and to guide it towards the splice section 18 for spliced joinder to a short fiber 30.

Specifically, the fiber channel 28 has a first section 36, a second section 38, a third section 40, and a fourth section 42, as illustrated in FIG. 2 and FIG. 3. The first section 36 extends from an end 44 of the half portion 22 to a point 46 at which the first section 36 joins the second section 38. The first section 36 has a substantially semi-circular latitudinal cross section. However, the first section 36 may bear strain relief means, as disclosed in the U.S. Pat. No. 5,134,678 of Essert et al. This patent is also assigned to the assignee of the present invention, and the disclosure thereof is incorporated herein by this reference.

For a further understanding of this aspect, reference should be had to the above-referenced United States patents. Thus, the first through fourth sections 36 through 42 act as means for guiding the fiber 24 to the splice section 18.

As shown in FIG. 2 and FIG. 3, the splice section 18 is separated from the fiber section 16 by a gap 52. The gap 52 extends across the half portions 22 a certain distance. The gap 52 extends across the fiber channel 28, and thus, the fiber channel 28 is not continuous across the demarcation between the fiber section 16 and the splice section 18. The gap 52 allows the halves 22 to be separated by the tool 26 for insertion of the fiber 24 while preventing that separation from propagating along the halves 22 where it might cause the fiber 30 to become dislocated within the splicer 10.

The splice section 18 of each half 22 receives one of a pair of metallic splice elements 60 which are preferably identical halves. Each element 60 has a fiber channel 54 which extends across the entire length of the splice section 18. The fiber channel 54 comprises a first section 56, a second section 58, and a third section 59. The first section 56 is substantially half-funnel shaped, and is intended to guide the optical fiber 24 from the fiber channel 28 into the second section 58. The third section 59 is constructed substantially similarly to the first section 56, and is intended to guide a short fiber 30 into the second section 58. A spliced connection between the optical fiber 24 and the short fiber 30 is accomplished at the center of the second section 58.

As implied above, to facilitate the splice between the optical fiber 24 and the short fiber 30, fiber splicing means in the form of two splice elements 60 are provided insertable into the splice sections 18 of the respective halves 22. The structure and functionality of these elements 60 is disclosed more fully in the above-referenced U.S. Pat. Nos. 5,121,456 and 5,134,678.

An end 50 of the splice section 18 opposite to the end thereof connection to the fiber section 16 defines the demarcation of and the juncture between the splice section 18 and the connecting section 20. In the embodiment shown in FIG. 1 through 3, the connecting section 20 is substantially cylindrical in external configuration, and extends away in a substantially coaxial fashion from an end 62 of the half portions 22.

The connecting section 20 has a substantially T-shaped longitudinal cross section. As illustrated in FIG. 2 and FIG. 3, the connection section 20 has a fiber channel 64 of sufficient dimensions to accept the short fiber 30. The fiber channel 64 extends from the end 62 to a point 66 proximate to the juncture between the base and the leg of the T-shaped cross section. It should be noted that the particular structure of section 20 shown herein is configured for use with an ST type adapter and connector. Other specific configurations for accommodating other connector types can be utilized without departing from the invention.

At the point 66, the fiber channel 64 terminates and communicates with a ferrule recess 68. The ferrule recess 68 is sufficient to accept a ceramic ferrule 70. The ferrule 70 has a dimple 72 for accepting complementary means for aligning and holding the ferrule 70 within the recess 68. The complementary means can take on the form of a boss or projection 73 which can be inserted into the dimple 72 to engage the ferrule 70. Preferably however, the ferrule 70 is secured in the recess 68 by a suitable adhesive. The ferrule 70 also has an axial bore 74 therethrough for accepting the short fiber 30, which is affixed thereto by a suitable adhesive.

When the ferrule 70 is properly mounted within the recess 68, the ferrule 70 extends beyond the terminal end of the splice body 12. The short fiber 30 extends from the second section 58 of the splice section 18 through the fiber channel 64, and through the axial bore 74 in the ferrule 70. Because the ferrule 70 extends beyond the splice body 12, the ferrule 70 can be inserted into an adapter 76 mounted on a panel 78 (see FIG. 3). The adapter 76 is of complementary configuration for mating with the connecting body or nut 14 and accepting the ferrule 70. The other end of the adapter is configured similarly, to accept a connector 75, which in the illustrated embodiment is an ST-type connector. This connects an optical fiber 25 joined to connector 75 with the optical fiber 24 carried in the splice body 12. The connector 75 carries the optical fiber 25 in a similar ferrule 77, which aligns with ferrule 70 in the adapter 76.

As indicated in FIG. 1 and FIG. 2, when the two half portions 22 are fused together, the construction of the connecting section 20 departs from the generally rectangular construction of the other elements of the splice body 12. Externally, the connecting section 20 is composed of a substantially cylindrical body 80 and a lip member 82. The body 80 defines the upright of the T-shaped longitudinal cross section, while the lip 82 defines the cross. Accordingly, when two half portions 22 are joined together, the bodies 80 and lips 82 on each half portion 22 join to form the substantially cylindrical connecting section 20.

The cylindrical body 80 is connected at one end to the splice section 18, and is connected at another end to the lip member 82. The cylindrical body 80 has a diameter larger than a thickness, but smaller than a width of the assembled-half portions 22. The lip member 82 has a diameter larger than the diameter of the body 80. As will become more clear presently, the connecting section 20 serves as a mount for the connecting body or coupling element or nut 14.

The construction of the connecting body 14 is also shown in FIG. 4. Specifically, the connecting body or coupling element or nut 14 comprises a substantially planar base 84 having a substantially perpendicularly depending substantially cylindrical tubular or hollow skirt or body 86. The cylindrical body 86 has an inner diameter 88 and an outer diameter 90. The inner diameter 88 is sufficient to accept the width of the splice body 12.

The body 86 has a pair of L-shaped slits 92 preferably located thereon in a diametrically opposed fashion. The slits 92 are positioned for accepting pins 94 disposed on the adapter 76. Together, the slits 92 and the pins 94 form locking means 96 for releasably locking the splicer 10 to the adapter 76, as will become more clear hereinafter. The slits 92 are disposed so that the pins 94 will become locked therein by advancement and rotation of the connecting body 14.

The base 84 of the connecting body 14 has a slot 96 therein. The slot 96 comprises a substantially rectangular section 98 and a circular center section 100 of diameter larger than the width of the rectangular section 98, as shown in FIG. 4. The dimensions of the rectangular section 98 are sufficient to accept the splice body 12 to allow the connecting body 14 to slide over the splice body 12 from the end 44 to the cylindrical body 80.

The circular section 100 is sufficient to allow for rotation of the connecting body 14 about the cylindrical body 80. However, it is to be noted that the dimensions of the slot 96 are insufficient to allow the connecting body 14 to move past the lip member 82. Accordingly, when the connecting body 14 is rotated about the cylindrical body 80 sufficiently so as to misalign the rectangular section 98 of the slot 96 and the external configuration of the splice body 12, the connecting body 14 is releasably trapped between the lip 82 and the end 62. However, the connecting body 14 can be freed by aligning the rectangular section 98 and the external configuration of the splice body 12.

To facilitate operation of the connecting body 14, it is preferably spring-biased. Accordingly, the helical compression spring 102 is disposed around the cylindrical body 80 between the lip 82 and the base 84 when the connecting body 14 is properly located on the connecting section 20. The spring 102 has an inner diameter sufficient to freely surround the cylindrical body 80.

However, the inner diameter of the spring 102 is small enough to allow the spring 102 to be compressed between the lip 82 and the base 84 as the connecting body is advanced relative to the adapter 76. The lip 82 has a spring compression surface 104 disposed on a side thereof opposite to the end 62. Additionally, to either side of the slot 96 in the base 84 of the connecting body 14 is a spring compression surface 106. Thus, the connecting member 14 is biased by the compression of the spring 102 between the spring compression surfaces 104 and 106. The above-described coupling element 14, spring 102 and connecting section 20 are configured for use with an ST-type adapter and connector. Other specific configurations of these elements for use with other types of adapter and connector might be utilized without departing from the invention.

With the structure of the splicer-connector 10 thusly described, the employment of the same will now be discussed. To begin assembly, two half portions 22 are selected, and the splice elements 60 are properly located thereon, as disclosed in the above-referenced patent. The two half portions 22 are sonic welded or fused together along one side of the fiber channel 42 to form the splice body 12. When the half portions 22 are so fused together, the mirror image structures described above mate to form completed elements, similar in structure and function to those disclosed in the above structure and function to those disclosed in the above-referenced U.S. Pat. Nos. 5,121,456 and 5,134,678. Moreover, a tool channel 107, sufficient to accept the tool 26, is formed to the side of the fiber channel 42 opposite to the fused-together side, for facilitating flexible partial separation of the half portions 22 for fiber insertion and/or removal, as more fully described in the above-referenced copending applications.

Now, the ferrule 70 is installed and affixed to the recess 68, using a suitable adhesive. Then, one end of the short fiber 30 is inserted into one end of the axial bore 74 in the ferrule 70. The half portions 22 are flexibly separated slightly by use of a suitable tool in tool channel 107 to allow for insertion of the short fiber 30 through the ferrule 70 and the fiber channel 64 into the channels 58 of the splice elements 60.

The half portions 22 are then returned towards their original, flexibly fused condition by appropriate manipulation of the tool 26 relative to the tool channel 107.

This locks the short fiber 30 and the ferule 70 in place within the splice 10.

After the installation of the short fiber 30 and the ferrule 70, the connecting section 20 is ready to accept the connecting body or nut 14. The splice body 12 is inserted through the inner diameter of the spring 102 so that the spring 102 is located between the spring compression area 104 and the end 62 of the half portions 22.

The splice body 12 is inserted into the cylindrical body 86 of the connecting body, coupling element or nut 14 until the end 44 of the half portions 22 engages the base 84. The connecting body 14 is rotated with respect to the splice body 12 to align the slot 96 with the external configuration of the splice body 12. The splice body 12 is inserted through the slot 96 until an end of the spring 102 engages the spring compression area 104 on the base 106 of the nut 14.

The coupling element or nut 14 is moved towards the lip 82, compressing the spring 102, until the nut 14 is properly located on the connecting section 20. The nut 14 is rotated with respect to the splice body 12 so as to misalign the slot 96 and the external configuration of the splice body 12. The nut 14 is now releasably retained in the appropriate position about the connecting section 20. All of the above-detailed steps can be performed at the factory, although that is not necessary.

Now, the splicer 10 is ready to form a spliced connection between another optical fiber 24 and the short fiber 30. To do this, the tool 26 is inserted into the tool channel 107. The tool 26 is rotated with respect to the splicer 10, thereby flexibly separating the half portions 22.

The optical fiber 24 is inserted into the fiber channel 28. The optical fiber 24 is inserted until it encounters and enters the channels 58 of the splice elements 60 at an end thereof opposite to the short fiber 30. The optical fiber 24 is thusly fully inserted into the fiber channel 28. The tool 26 is again rotated with respect to the splicer 10 and the adapter 76, thereby returning the half portions 22 towards their flexibly fused original condition for resiliently clamping fibers 24 and 30 within the channel 58.

The splicer-connector 10 is now ready for insertion into the adapter 76. To insert the splicer-connector 10 into the adapter 76, the splicer-connector 10 is positioned so as to align an end of the ferrule 70 protruding from the splicer-connector 10 with a corresponding bore 108 in the adapter 76. The bore 108 mounts a somewhat oversize sleeve 109 to loosely accept the ferrule 70. The ferrule 70 and the connecting section 20 are inserted into a projecting skirt 110, which accepts the connecting section 20.

Full insertion of the connecting section 20 is defined by a positive stop member 112 located in the skirt 110. When the lip 82 contacts the positive stop member 112, the connecting section 20 is fully inserted into the skirt 110, and the ferrule 70 is properly positioned within the sleeve 109 in the bore 108. Ferrule 77 and connector 75 maybe similarly aligned and coupled with the adapter 76 from its opposite end.

When the second connector 75 is coupled with the adapter 76, the above-described alignment of the ferrule 70 will cause the ferrule 70 to align with the similar ferrule 77 of connector 75 thereby connecting a fiber 25 carried by connector 75 with the short fiber 30.

The connecting body or coupling element or nut 14 is utilized to releasably lock the splicer-connector 10 together with the adapter 76. The inner diameter 88 of the cylindrical body 86 is sufficient to accept the skirt 110 on the adapter 76. The connecting body 14 is rotated with respect to the splicer-connector 10 and the adapter 76 to align the pins 94 on the exterior of the skirt 110 of the adapter 76 with the slits 92 on the cylindrical body 80. A similar, oppositely projecting skirt 110 of the adapter 76, having similar pins 94 engages connector 25 in similar fashion.

The connecting body 14 is moved towards the positive stop member 112, compressing the spring 102 and causing the pins 94 to move into the slits 92. The pins 94 move into the slits 92 until they encounter the angle of each defined by their L-shaped configurations. At this point, the connecting body 14 is rotated with respect to the splicer 10 and the adapter 76, allowing the pins 94 to move further into the slits 92. The pins 94 move to the terminal end of the slits 92, thusly releasably locking the splicer 10 with the adapter 76.

A splicer-connector 114, which is another embodiment of the present invention, is illustrated in FIGS. 5, 6, and 7. The splicer-connector 114 provides substantially the same benefits as are provided by the splicer 10, however, the splicer-connector 114 comprises a connecting section or assembly 116 and a separate splice section or assembly 118 interengagable with the connector assembly 116 to form the splicer-connector 114. Means for joining the connecting and splice assemblies 116 and 118, respectively, are provided for insuring a firm, rigid, yet disengagable connection therebetween to form the splicer-connector 114.

The connecting assembly 116 comprises a body portion 120 having an axial bore or fiber channel 122, shown in FIG. 7, for accepting a short fiber 124 substantially similar to the short fiber 30, and for guiding the fiber to a splicing portion or area 119 of the splice section or assembly 118. The axial bore 122 extends longitudinally through the entire length of the connecting assembly 116. The axial bore 122 enlarges diametrically at one end of the body 120 for accepting a ferrule 128 substantially similar to the ferrule 70.

The body portion 120 includes a portion of the means for joining the connecting and splice sections or assemblies 116 and 118, respectively, in the form of a frusto-conical projection 126, illustrated in FIGS. 5 and 7, extending from one end of the body 120. The frusto-conical projection 126 is tapered for facilitating insertion thereof into a complementary frusto-conical recess 130 disposed on the splice section or assembly 118, as will be discussed further hereinafter. The location of these parts 126, 130 could, of course, be reversed without departing from the invention. The frusto-conical projection 126 also includes a protruding alignment rib 132 for facilitating alignment of the assemblies 116 and 118 to form the splicer-connector 114. The rib 132 extends longitudinally along an outer surface of the projection 126 in substantially linear fashion, and engages a complementary notch or channel 142 in recess 130, to be described more fully hereinbelow.

The body 120 of the connecting section or assembly 116 is surrounded by a connecting body 134 in substantially the same manner as the connecting section 20 is surrounded by the connecting body 14 in the embodiment of FIGS. 1 through 4. The motion of the connecting body 134 is biased by a helical compression spring 136, which freely surrounds body portion 120 for compression between a radially projecting lip 138 on body portion 120 and a radially inward projection 140 disposed on the body 134. A snap ring 142, held in a complementary groove in body 120, holds the body 120, the body 134 and the spring 136 together in assembled condition, as best viewed in FIG. 7. In this manner, the connecting body 134 functions substantially similar to the body 14 of FIGS. 1 through 4, and may be suitable configuration for mating with a selected type of adapter.

The construction and configuration of the splice assembly 118 is illustrated in FIGS. 5 and 7. Splice section or assembly 118 has a splicing portion or area 119 and a fiber portion or area 121 substantially similar in construction and operation to the splice section 18 and the fiber section 16 of FIGS. 1 through 4. One difference between the splice assembly 118 and the combination of the fiber section 16 and the splice section 18, as illustrated in FIGS. 2 and 3, is the presence of a portion of the means for joining the connecting section or assembly 116 and the splice section or assembly 118 disposed on one end of the splice section or assembly 118 in the form of the frusto-conical recess 130.

The frusto-conical recess 130 is constructed for accepting the frusto-conical projection 126 on the body 120, viz. the frusto-conical projection 126 is inserted into the frusto-conical recess 130. The facilitate proper alignment during and after insertion, the recess 130 includes a further recessed alignment notch or channel 144 for accepting the rib 132 on the projection 126. The notch 144 is dimensioned so that the rib 132 can slide into the notch 144 when the projection 126 is appropriately inserted into the recess 130.

When the assemblies 116 and 118 are properly aligned for insertion of the rib 132 into the notch 144, an appropriate force is applied to the assemblies 116 and 118 to press fit the assemblies 116 and 118 together. The resultant press fit maintain the assemblies 116 and 118 together for subsequent operations, such as insertion of an optical fiber into the splice assembly 118 for optical connection to the short fiber 124. Alternatively, if desired, a snap-type fit can be provided between the assemblies 116 and 118. Additionally, a bead of glue maybe provided between the sections 126 and 130, or the sections 126 and 130 may be appropriately welded together to further insure a strong, permanent connection between the assemblies 116 and 188, if desired.

The unique two-part construction of the splicer-connector 114 provides significant benefits over the splicers of the prior art. Specifically, the particular construction of the splicer-connector 114 allows it to be nondestructively tested in a factory. Therefore, the transmission quality of the assembly 116 can be carefully monitored and insured before installation of the splicer-connector 114 into a telecommunications circuit. The transmission quality is primarily dependent upon the quality of the cleave and polish of fiber 124.

A typical apparatus 146 for testing the transmission quality of the assembly 116 in the splicer-connector 114 is illustrated generically in FIG. 8. The apparatus 146 generally comprises a light source 148 optically connected to a jumper 150 for directing light into the connector assembly 116, an adapter 152 for connecting the jumper 150 to the assembly 116, a base 154 for holding the assembly 116, a detector 156, such as a photovoltaic cell, for monitoring light intensity located at a bottom of the base 154, and a meter 158 for measuring the signal generated by the detector 156.

The adapter 152 is provided on a distal end of the jumper 150 for connecting the assembly 116 optically in alignment with the light source 148 so that the light beam produced by the source 148 can be transmitted along the short fiber 124 towards the detector 156. The adapter 152 is dimensioned for accepting the ferrule 128.

In operation, the light source 148 emits a beam of light which is directed into the jumper 150. This light beam is transmitted through the jumper 150 towards the detector 156 in the base 154. The light strikes the detector 156, thereby generating a signals which is, in turn, measured by the meter 158. This operation is conducted initially with the assembly 116 out of the base 154 and the adapter 150 placed directly into the base 154 to give a base line reading. Thereupon the adapter 150 is removed, the assembly 116 is re-inserted into the base 154, and the adapter 150 is reconnected in the configuration, shown in FIG. 8. The base 154 is specifically constructed to accept and to support either the adapter 150 or the assembly 116.

The light beam is transmitted along the fiber 124, and exists at a free end thereof towards the detector 156, as shown in FIG. 8. The detector 156 reacts to the presence of the light beam, and the meter 158 measures the signal generated thereby. The proportion of the two measurements, e.g. in db, can now be calculated and this gives a measure of the transmission quality of the assembly 116. The construction of the assembly 116 thereby allows it to be tested nondestructively before it leaves a factory. Therefore, the splicer-connector 114, of which the assembly 116 is a part, is, in effect, capable of being tested for optical power loss or attenuation before the completed, assembled splicer-connector 114 leaves the factory. This can result in reduction of time required to install and/or replace optical fiber splicers because they would not have to be tested in the filed. However, it is to be noted that the splicer-connector 114 can also be tested by using the older, in-the field methods.

It is again to be noted that further details regarding the structure and functionality of the splicer-connectors 10 and 114 can be obtained by reference to the above-cited patents. Because the splicer-connectors 10 and 114 combine the elements of a splice with the elements of a connector in one piece, the splicer-connectors 10 and 114 are a substantial improvement over the optical fiber splices of the prior art. The prior art splicer 162, illustrated generally in FIG. 9, required utilization of a separate connector 164 optically joined to the splicer 162 by mens of a pigtail fiber 166. This pigtail fiber 166 can be quite long, on the order of tens of feet, which makes it unattractive in many networks where space is at a premium.

This prior art structure also implies separate cabinets, equipment, etc. for maintaining the splicer 162 on the one hand and connectors 164 on the other hand, with the required length of pigtail 166 connecting the two. Thus, the pigtail 166 often must be coiled in practice to accommodate excess length. This requires care and/or other measures to maintain minimum bend radii to avoid optical transmission losses. This arrangement also leads to the requirement that many different lengths of pigtail 166 be provided for selection in given applications. This is inconvenient from a standpoint of serviceability and inventory control, particularly in the field. Hence, the splicer-connectors 10 and 114, in accordance with the invention, can allow the telecommunications network operator to save space as well as revenues by overcoming the foregoing problems inherent in the prior art.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A splicer-connector for connecting optical fibers comprising: a splice section configured for achieving an optical splice connection between ends of two optical fibers, and a connecting section configured for engaging an adapter for accepting a connector for achieving a repeatably engagable and disengagable optical connection between an optical fiber carried by the connector and an optical fiber carried by said connecting section; the splice section being disposed adjacent the connecting section; means for splicing optical fibers disposed on the splice section; a fiber channel disposed on the connecting section for accepting a pigtail optical fiber to be connected between the first and second fibers and for guiding the pigtail optical fiber to the splice section; a coupling element mounted to the connecting section and configured for releasable attachment to an adapter; the connecting section being joined in close proximity to the splice section; wherein the connecting section comprises a body portion projecting integrally from the splice section and having a lip portion at a free end thereof, configured for receiving and mounting the coupling element; and wherein the coupling element comprises a substantially cylindrical body having a base, and a compression spring located for compression between said base and said lip portion of said connecting section, and said cylindrical body being configured for releasable attachment to an adapter.

2. A splicer-connector for connecting optical fibers comprising: a splice section configured for achieving an optical splice connection between ends of two optical fibers, and a connecting section configured for engaging an adapter for accepting a connector for achieving a repeatably engagable and disengagable optical connection between an optical fiber carried by the connector and an optical fiber carried by said connecting section; the splice section being disposed adjacent the connecting section; means for splicing optical fibers disposed on the splice section; a fiber channel disposed on the connecting section for accepting a pigtail optical fiber to be connected between the first and second fibers and for guiding the pigtail optical fiber to the splice section; a coupling element mounted to the connecting section and configured for releasable attachment to an adapter; the connecting section being joined in close proximity to the splice section; and further including a frusto-conical projection located on one of the connecting section and the splice section, and a complementary frusto-conical recess located on the other of the connecting section and the splice section; and the frusto-conical projection being interengagable with the complementary frusto-conical recess in a press fit for rigidly coupling the connecting section in close proximity to the splice section.

3. A splicer-connector for connecting optical fibers comprising: a splice section configured for achieving an optical splice connection between ends of two optical fibers, and a connecting section configured for engaging an adapter for accepting a connector for achieving a repeatably engagable and disengagable optical connection between an optical fiber carried by the connector and an optical fiber carried by said connecting section; the splice section being disposed adjacent the connecting section; means for splicing optical fibers disposed on the splice section; a fiber channel disposed on the connecting section for accepting a pigtail optical fiber to be connected between the first and second fibers and for guiding the pigtail optical fiber to the splice section; a coupling element mounted to the connecting section and configured for releasable attachment to an adapter; the connecting section being joined in close proximity to the splice section; further comprising a ferrule disposed on the connecting section; and the ferrule having an axial bore for accepting an optical fiber.

4. A splicer-connector as defined in claim 3 wherein the ferrule extends beyond an end of the connecting section opposite to an end thereof connected to the splice section.

5. A splicer-connector as defined in claim 3 wherein the ferrule has a dimple thereon for accepting ferrule alignment and retention means for firmly holding the ferrule in the connecting section.

6. A splicer-connector for connecting optical fibers comprising: a splice section configured for achieving an optical splice connection between ends of two optical fibers, and a connecting section configured for engaging an adapter for accepting a connector for achieving a repeatably engagable and disengagable optical connection between an optical fiber carried by the connector and an optical fiber carried by said connecting section; the splice section being disposed adjacent the connecting section; means for splicing optical fibers disposed on the splice section; a fiber channel disposed on the connecting section for accepting a pigtail optical fiber to be connected between the first and second fibers and for guiding the pigtail optical fiber to the splice section; a coupling element mounted to the connecting section and configured for releasable attachment to an adapter; the connecting section being joined in close proximity to the splice section; wherein the coupling element comprises a substantially planar base and a substantially perpendicularly depending tubular cylindrical body, and the cylindrical body being configured for releasable attachment to an adapter; and further comprising locking means disposed on the cylindrical body for releasably locking engagement with an adapter, wherein the locking means comprises at least one slit for accepting a pin disposed on an adapter.

7. A splicer-connector for connecting optical fibers comprising: a connector assembly and a splice assembly; a connecting body disposed on the connector assembly for releasably attaching to a mating connector; a fiber channel located in the connector assembly for accepting an optical fiber; means for splicing optical fibers disposed on the splice assembly; a fiber channel disposed on the splice assembly for guiding optical fibers to the means for splicing optical fibers; and mating means for rigidly and non-removably connecting the connector assembly with the splice assembly, said mating means being disposed respectively on the connector assembly and the splice assembly.

8. A splicer-connector as defined in claim 7 wherein the mating means for connecting the connector assembly with the splice assembly comprises a frusto-conical projection located on one of the connector assembly and the splice assembly, and a complementary frusto-conical recess located on the other of the connector assembly and the splice assembly; and the frusto-conical projection being interengagable with the complementary frusto-conical recess in a press fit for rigidly joining the connector assembly with the splice assembly to form the splicer-connector.

9. A splicer-connector as defined in claim 7 further comprising a ferrule having an axial bore for accepting an optical fiber disposed on and extending beyond an end of the connector assembly opposite to the end thereof on which the means for connecting the connector assembly with the splice assembly is disposed.

10. A splicer-connector as defined in claim 7 further comprising means for aligning the connector assembly with the splice assembly.

11. A splicer-connector as defined in claim 8 and further including a channel formed in the recess and a complementary rib formed on the projection and slidably insertably into the channel for aligning the connector assembly with the splice assembly.

12. A splicer-connector as defined in claim 7 and further including means for mounting a short optical fiber in said connector assembly, said short optical fiber projecting outwardly of said connector assembly for insertion into the means for splicing optical fibers disposed on the splice assembly upon connection of the connector assembly with the splice assembly, said projecting portion of said short optical fiber also interfitting with means for testing of the optical integrity of said short optical fiber prior to the connection of the connector assembly with the splicer assembly.

13. A unitary, integral splicer-connector for both splicing and connecting optical fibers, and for permitting repeated engagement and disengagement of an optical connection between a first optical fiber carried by said splicer-connector, and a second optical fiber carried by a mating connector, said splicer-connector comprising: a shell having a splicing section and a connecting section integrally and non-removably joined to said splicing section, said connecting section having a fiber channel and a coupling element for releasable engagement with said mating connector, said splicing section including a splice compartment; a splicer mounted in said splice compartment and comprising a first splice body having a splice channel aligned with said fiber channel of said connecting section and a second splice body for cooperating with said first splice body for maintaining optical fibers in a spliced condition therebetween; and a pigtail fiber having one end disposed in said fiber channel and an opposite end disposed in said splice channel, said splice channel receiving said first optical fiber at a first end thereof and said opposite end of said pigtail optical fiber at the other end thereof for splicing said first optical fiber to said pigtail optical fiber.

14. A splicer-connector according to claim 13 wherein said splicer further includes parting means for momentarily separating said first and second splicer bodies for inserting said first optical fiber and said pigtail optical fiber into said splicer channel.

15. A splicer-connector according to claim 14 wherein said first splice body and second splice body are substantially identical.

16. A splicer-connector according to claim 14 wherein said parting means comprises a parting channel parallel to and spaced from said splice channel and configured for receiving a complementary tool for releasably separating said first and second splicer bodies.

17. A splicer-connector according to claim 13 wherein said splicing section comprises a clamshell-like assembly for resiliently urging said first and second splice bodies together for holding said first optical fiber and said pigtail optical fiber spliced therebetween.

18. A splicer-connector according to claim 17 and further including a parting channel parallel to said splice channel for receiving a complementary tool for releasably separating said first and second splice bodies, overcoming the resilient urging of said clamshell-like splicing section.

19. A splicer-connector according to claim 13 wherein said connecting section has a lip portion at an end thereof remote from said splicing section and configured for captively holding said coupling element; and wherein said coupling element comprises a substantially cylindrical hollow body having a base, and further including a compression spring mounted for compression between said base and said lip portion of connecting section, said cylindrical body being further configured for releasable attachment to a mating connector.

20. A splicer-connector according to claim 12 wherein said splicing section further includes a joining portion, and said connecting section includes a complementary joining portion configured for interfitting with the joining portion of said splicing section and further including means for rigidly non-removably connecting said joining portion with said complementary joining portion.

21. A splice-connector according to claim 20 wherein each of said joining portion is said complementary joining comprises one of a frusto-conical projection and a mating frusto-conical recess.

22. A splicer-connector according to claim 13 wherein said splicing section in said connecting section are integrally formed.

23. A splicer-connector according to claim 13 and further including a ferrule mounted to said connecting section and extending outwardly thereof and having a through bore therein for receiving said one end of said pigtail fiber therethrough.

24. A splicer-connector according to claim 20 and further including complementary alignment means formed respectively on said joining portions for aligning said connecting section with said splicing section.

25. A splicer-connector according to claim 21 and further including alignment means formed respectively in said recess and on said projection for aligning said connecting section with said splicing section.

* * * * *